July 31, 1962
V. C. STERRETT
3,047,004
PROPORTIONER AND MIXER, AND TUMBLING DIFFERENTIAL
FOR CONTROLLING THE ACTION THEREOF
Filed Dec. 1, 1958
5 Sheets-Sheet 1
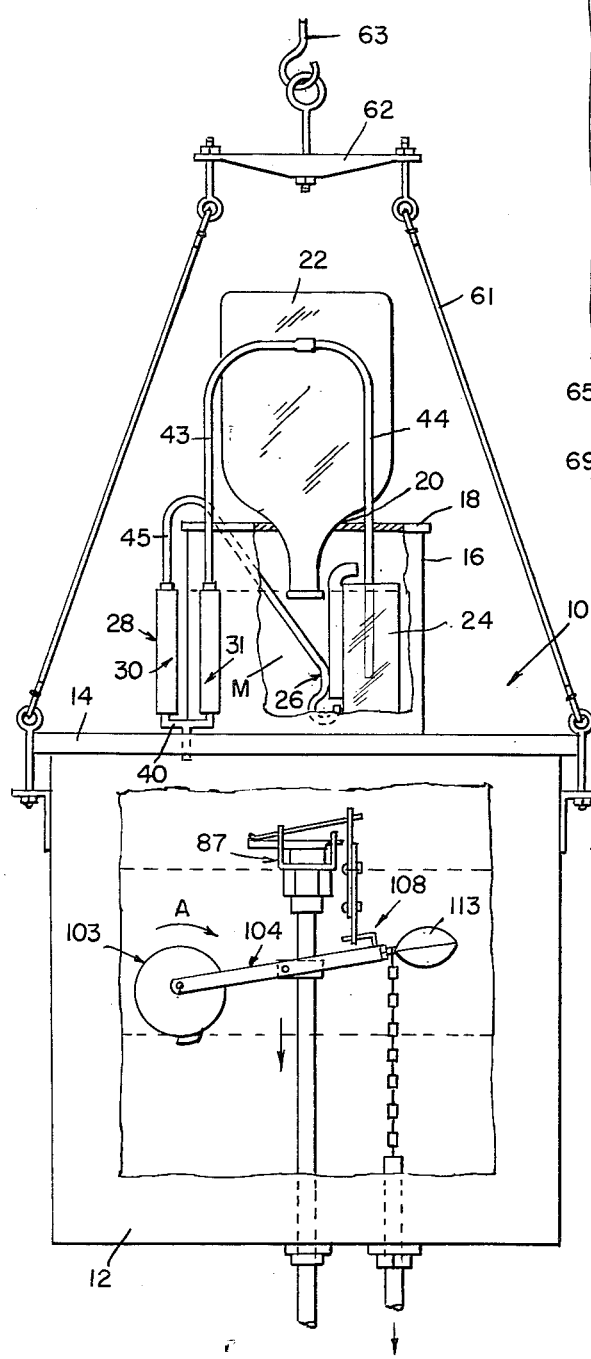
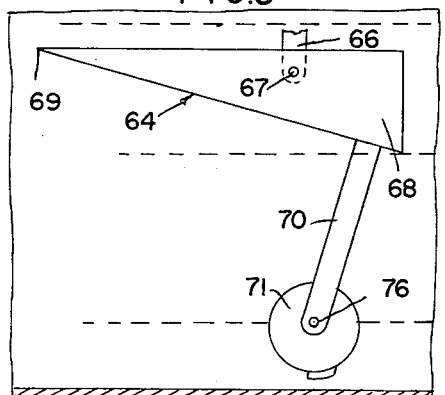
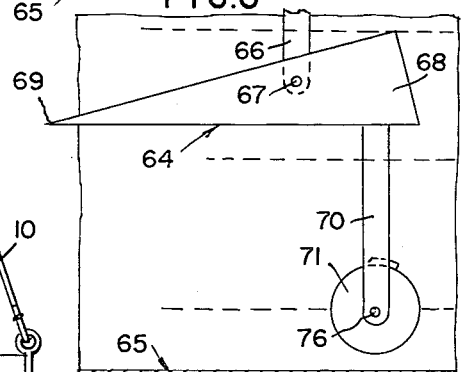
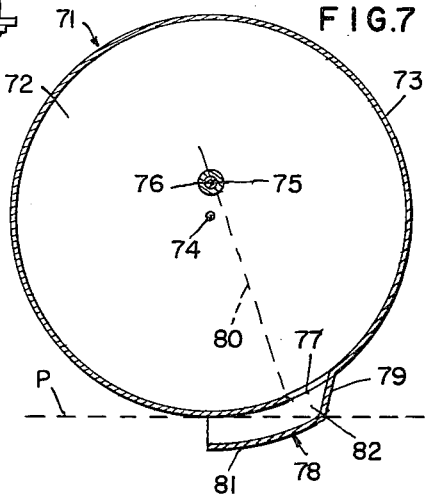
INVENTOR.
Vance C. Sterrett
BY
Shoemaker & Mattare
ATTYS July 31, 1962  V. C. STERRETT  3,047,004
PROPORTIONER AND MIXER, AND TUMBLING DIFFERENTIAL
FOR CONTROLLING THE ACTION THEREOF
Filed Dec. 1, 1958  5 Sheets—Sheet 2
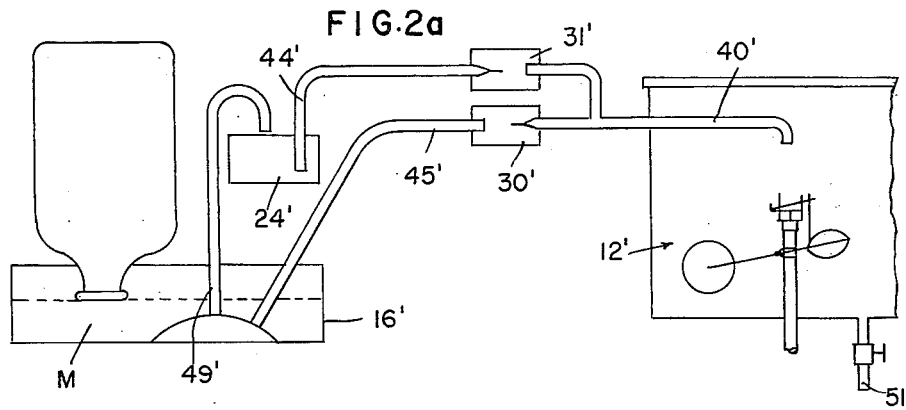
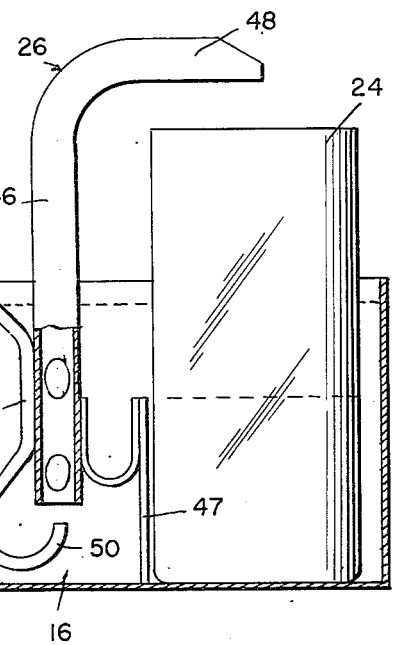
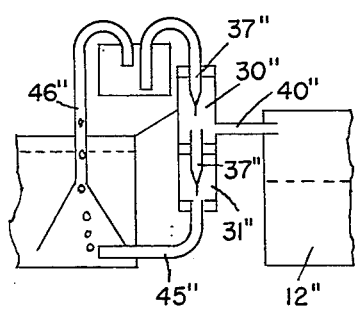
INVENTOR.
Vance C. Sterrett
BY
Shoemaker & Mattare
ATTYS

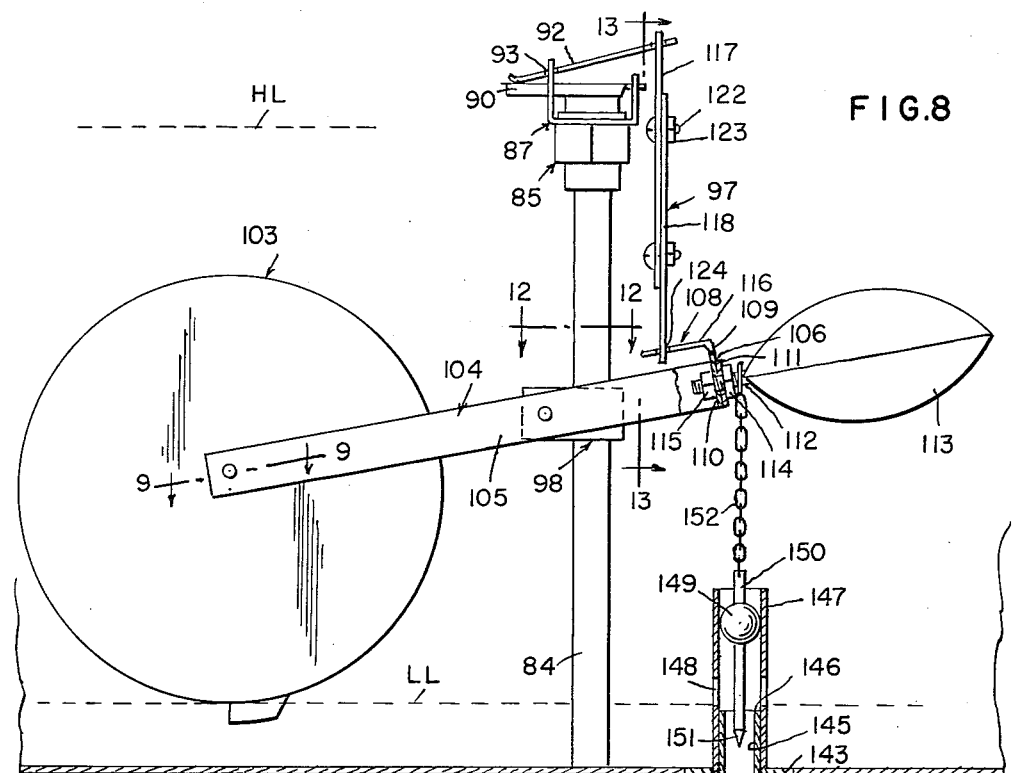

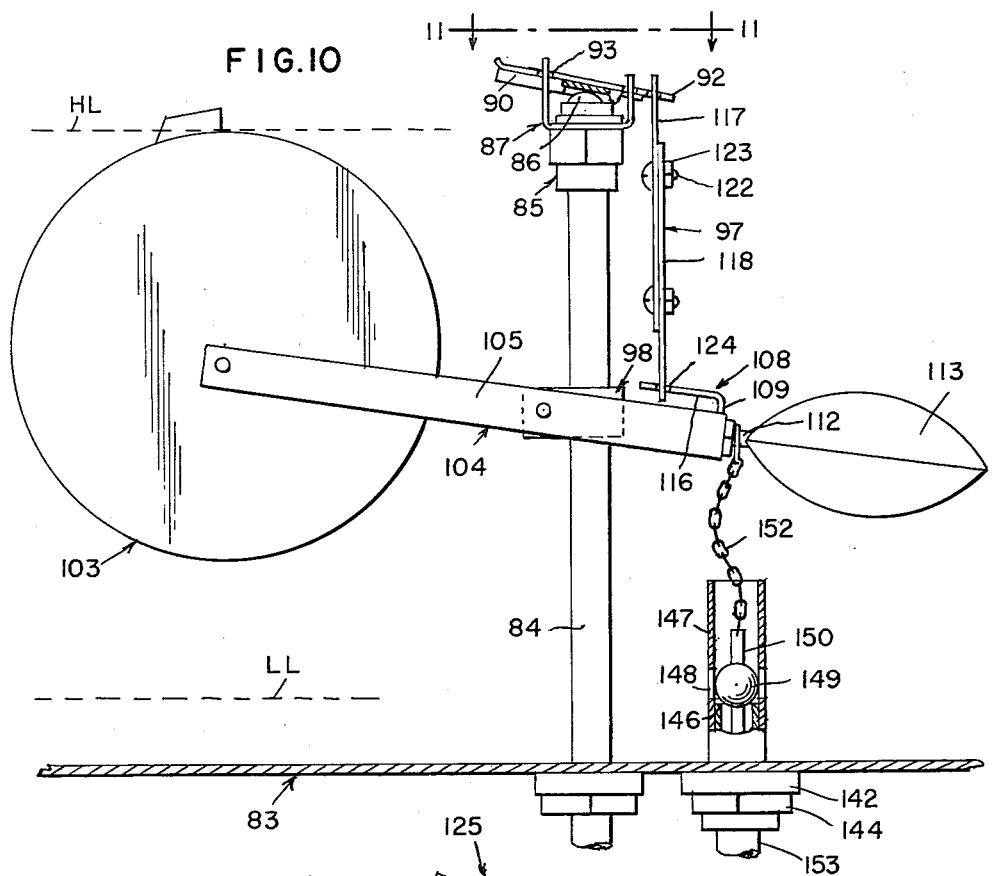
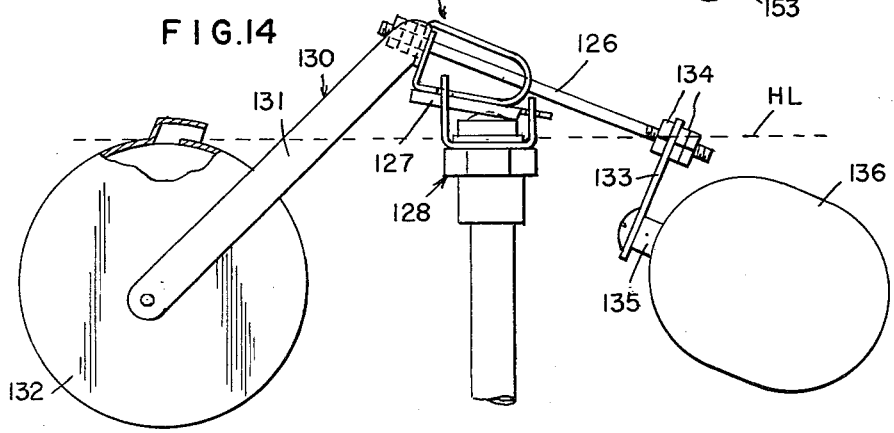
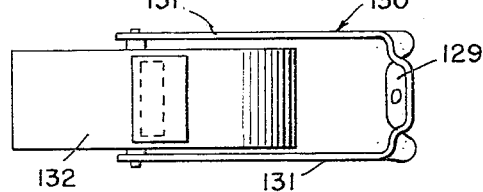

July 31, 1962 V. C. STERRETT 3,047,004
PROPORTIONER AND MIXER, AND TUMBLING DIFFERENTIAL
FOR CONTROLLING THE ACTION THEREOF
Filed Dec. 1, 1958 5 Sheets-Sheet 5
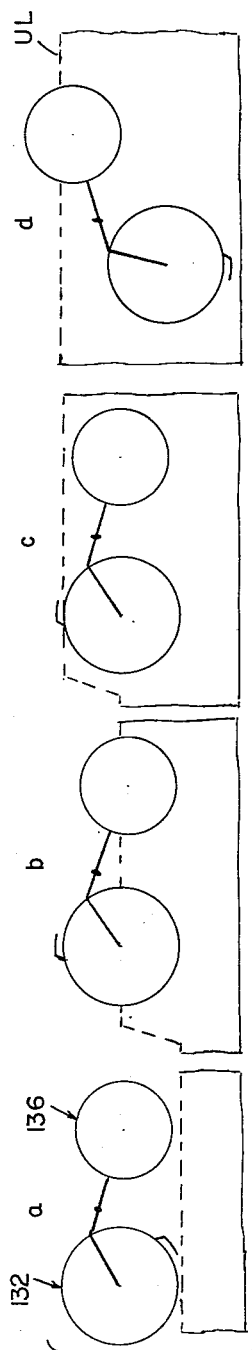
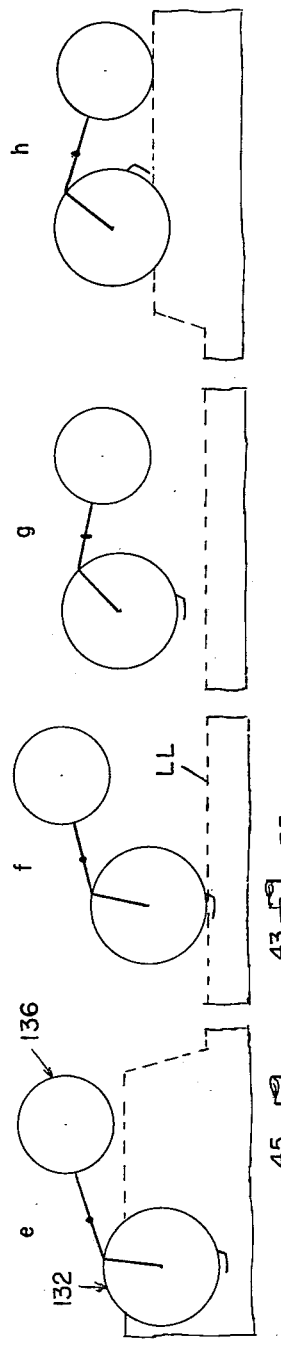
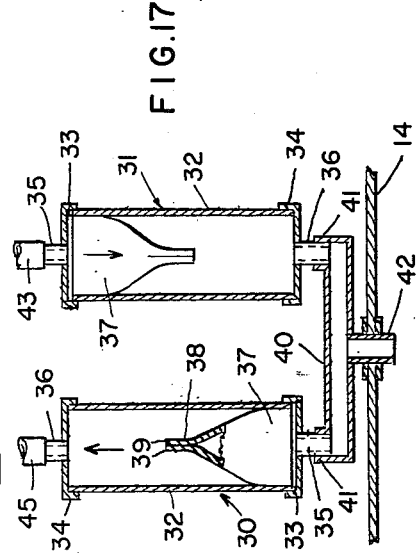
INVENTOR.
Vance C. Sterrett
BY
ATTYS

United States Patent Office 3,047,004
Patented July 31, 1962

3,047,004
PROPORTIONER AND MIXER, AND TUMBLING DIFFERENTIAL FOR CONTROLLING THE ACTION THEREOF
Vance C. Sterrett, Logansport, Ind.
(1135 N. Beville, Indianapolis 1, Ind.)
Filed Dec. 1, 1958, Ser. No. 777,313
17 Claims. (Cl. 137—101.25)

This invention relates to liquid proportioning and mixing devices.

The present invention is adapted to or designed for the proportioning and mixing of liquids generally, though primarily it is devised for proportioning medicines and mixing the same with the water of stock and poultry waterers.

In the practice of animal husbandry, it is conventional to mix certain medicines with watering troughs or devices from which stock and poultry may drink, and this ordinarily involves the operation of measuring out given quantities of medicines at intervals for introduction into the water receptacle so that the stock, poultry, etc. will take the medicine as they drink the water.

It is accordingly one object of the present invention to provide a device by means of which liquid medicines may be measured and dispensed either automatically at regular intervals into the water which goes into the watering device or which can be dispensed or caused to be discharged at selected or irregular intervals from the measuring device by manual operation of valves controlling the passage of the water and medicine mixture into pipes or conduits leading to the watering device.

Another object of the invention is to provide a novel liquid proportioning and mixing device wherein a novel means is provided whereby the passage of a quantity of water from a receptacle will function to draw a predetermined proportion of medicine from a measuring receptacle into the chamber containing the outflowing water and wherein the re-filling of the water chamber or receptacle will effect the removal of medicine from a source of supply and discharge it into a measuring receptacle preparatory for extraction and discharge upon the next emptying thereof.

A still further object of the invention is to provide a novel bubble pump structure which is made operative by air compressed in the hereinbefore referred to water receptacle as the latter is re-filled following the emptying operation and which bubble pump constitutes the means by which medicine is withdrawn from a source of supply and introduced into the measuring receptacle.

A still further object of the invention is to provide a liquid proportioning and mixing device embodying the hereinbefore referred to water receptacle, source of supply for medicine or other liquid and the novel bubble pump structure, with a novel means in the water receptacle for receiving the medicine or other liquid as it is drawn from the measuring receptacle by a reduced atmospheric pressure in the water receptacle created by the outflowing of a mixture of medicine and water therefrom and for dumping the received measured quantity of medicine or other liquid into the water receptacle as the latter is re-filled and as atmospheric pressure therein is built up by reason of such re-filling for actuating the bubble pump.

A still further object of the invention is to provide a novel liquid operated tumbling device for actuating the medicine or other liquid receiving pan or receptacle and which, by reason of its novel construction, will move the liquid receiving pan to and maintain the same in liquid receiving position while the previously prepared mixture of water and medicine or other liquid is being drawn off and then dump the contents of the pan while the water receptacle is being re-filled with water whereby to effect a thorough mixing of the medicine or other liquid with the inflowing fresh water.

It is a still further object of the invention to provide a new and novel tumbling differential assembly for controlling the opening and closing of a valve associated with the receptacle such as the water receptacle of the device hereinbefore referred to, which is designed in a novel manner to maintain the valve in closed position until the water flowing into the water chamber or differential sump has risen to a desired elevation and to then effect the rapid closing of the valve and which differential assembly further functions, after the valve has been closed, to maintain the latter in closed position while the water containing receptacle or sump is being emptied and until the water level has reached a maximum low point and then effect the rapid opening of the valve.

The invention will be best understood from a consideration of the following detailed description taken in connection with the accompanying drawings with the understanding that the invention is not confined to a strict conformity with the showing of the drawings but may be changed or modified so long as such changes or modifications mark no material departure from the salient features of the invention as expressed in the appended claims.

In the drawings:

FIG. 1 is a view in side elevation of a liquid proportioner and mixer device constructed in accordance with a preferred embodiment of the present invention with parts broken away to show the construction and arrangement of enclosed units;

FIG. 2a is a diagrammatic view intended for illustrating the principle upon which the proportioner and mixer device functions;

FIG. 2b is another diagram illustrating another arrangement of parts by which the operation of the proportioner and mixer may be operated;

FIG. 3 is a detail view on an enlarged scale illustrating one form of the bubble pump structure;

FIG. 4 is a detail view illustrating another form in which the bubble pump may be constructed;

FIG. 5 illustrates an application of the tumbling differential to a medicine receiving pan showing the position in which the pan is maintained during the withdrawal of a previously prepared water and medicine mixture from the differential sump;

FIG. 6 is a detail view corresponding to FIG. 5 and illustrating the position to which the tumbling differential shifts the pan for discharging the pan contents and which position the pan will maintain during a part of the time that the receptacle or sump is being refilled with water.

FIG. 7 is a sectional view of a circular form of the differential taken in a plane perpendicular to the axis thereof and illustrating diagrammatically the manner in which the differential functions;

FIG. 8 is a view illustrating an improved form of the differential assembly involving the tumbling differential chamber and control float for effecting the opening and closing of a water inlet valve, the float and differential chamber being the valve closed position;

FIG. 9 is a sectional view taken substantially on the line 9—9 of FIG. 8;

FIG. 10 is a view corresponding to FIG. 8 but showing the differential assembly in reversed position for opening the valve;

FIG. 11 is a top plan of the valve ball actuating portion of the assembly viewing the same from the line 11—11 in FIG. 10;

FIG. 12 is a horizontal section taken substantially on the line 12—12 of FIG. 8 looking in the direction of the arrows;

FIG. 13 is a sectional view taken in a vertical plane on the line 13—13 of FIG. 8 looking in the direction of the arrows;

FIG. 14 is a view illustrating another arrangement of the float and differential chamber of the differential assembly and showing the same connected with a valve movement controlling bracket of the type illustrated in Patent No. 2,810,396;

FIG. 15 is a view in top plan of the differential chamber and mounting the frame therefor shown in FIG. 14;

FIG. 16 is a composite view illustrating diagrammatically the sequential stages of operation of the differential assembly of FIG. 8 or FIG. 14;

FIG. 17 is an enlarged detail sectional view through the one-way valve unit assembly showing the preferred manner of connecting the same with the differential sump; and FIG. 18 is a detail perspective of the lever plate supporting bracket.

Referring now more particularly to the drawings, the description of the invention will first be directed to the application of the components of the proportioning and mixing apparatus, a preferred form of which is illustrated in FIG. 1.

While the proportioner and mixer has been designed primarily for the proportioning and mixing of medicines with a carrier vehicle which may be water or any other suitable liquid as hereinbefore stated, and while in the succeeding description of the invention the description of the structure illustrated in FIG. 1 will be based upon the idea that it is for mixing medicines with a carrier vehicle, it is to be understood that in referring to "medicine" there is no intention to limit the use to which the device may be put.

Again referring to FIG. 1, the numeral 10 generally designates the medicine proportioner and mixer which, in the form illustrated, embodies a lower receptacle 12 hereinafter referred to as the sump or differential sump, the top of which receptacle or sump is covered by an air-tight closure 14.

Mounted upon the top of the cover 14 is another and smaller receptacle 16 hereinafter referred to as the medicine sump and which is closed by the top or cover 18 having a central opening 20.

The numeral 22 designates a receptacle here shown as being in the form of a conventional jug, such as the gallon jugs commonly used for various types of liquids, and this jug is adapted to contain the medicine or other liquid which is to be proportioned out and mixed with water or other vehicle in the differential sump and it is disposed in an inverted position in the manner shown with the neck thereof extending through the opening 20 so that the cotents of the jug or receptacle 22 will be discharged into the medicine sump until the level of liquid therein reaches the mouth of the jug, thereby shutting off further discharge of liquid and maintaining the latter at desired elevation.

Mounted within the medicine sump 16 is a measuring receptacle 24 having an open top which is at an elevation above the maximum level of medicine or other liquid in the sump 16 so that such liquid will not run over into the measuring receptacle.

Associated with the measuring receptacle and positioned within the sump 16 is a bubble pump unit which is generally designated 26, the details of which are illustrated in different forms in FIGS. 3 and 4 and also described hereinafter in connection with the diagrammatic illustrations forming FIGS. 2a and 2b.

Associated with the bubble pump unit 26 is a two-way check valve unit 28.

The two-way check valve unit embodies, as illustrated in FIG. 17, the two separate check valves 30 and 31, each of which consists of a cylinder 32 which may be of any desired material and which is here shown as having the end closure members or caps 33 and 34, which caps have outwardly opening or extending nipples 35 and 36 respectively. These cylinders and parts associated with them are of the same construction and, accordingly, in referring to the parts the same reference numerals will be applied to both the cylinders 32, but in use the check valves are in reversed positions one with respect to the other as will be apparent from the succeeding description.

Each of the cylinders 32 houses a valve element 37 which is in the form of an elastic tube which, at its outer end, is secured between the cap 33 and the adjacent edge of the cylinder 32. The tube is constricted inwardly to the flattened portion 38 and this flattened portion has its edges pressed together in the form of lips 39 which normally retain their contacting relationship and are only separated to permit fluid to pass through when such fluid enters the large end of the tubular valve element and flows toward the lipped end. As the valves 30 and 31 are set up in reversed relationship to one another as stated and as shown in FIG. 17, it will be apparent that they will function as check valves to permit the liquid to flow in one direction only.

The valve units 30 and 31 are attached to a manifold 40 which manifold is here illustrated as being in the form of a tube having closed ends and also having adjacent to each end a threaded collar 41. One of the collars has a nipple 36 of the valve unit 31, for example, secured therein while the other collar 41 has the nipple 35 of the other valve unit secured therein. Thus, it will be seen that one of the valve units is positioned to have the valve element 37 directed toward the nipple leading to the manifold 40 as, for example, the unit 31, while the other unit, the unit 30, has the valve element 37 therein directed away from the manifold 40.

The manifold 40 also has extending therefrom the coupling nipple 42 which is secured in the top or cover 14 of the differential sump 12.

Leading from the one-way valve unit 31 is a tube 34 which may be of flexible character and which is attached to one end of the second tube 44, which may be of glass or other suitable material and which passes through the top of the medicine sump downwardly into the measuring receptacle as illustrated. If desired, the tubes 43 and 44 may be formed throughout of rubber, plastic or the like instead of being of different materials as stated.

The nipple 36 of the other one-way valve unit designated 30 also has connected to it an end of a tube which is here designated 45, and this tube connects with an element of the hereinbefore referred to bubble pump unit 26 for feeding air under pressure as hereinafter described to the bubble pump unit, whereby to effect the operation of the latter and bring about the transfer of medicine or other liquid from the sump 16 into the measuring receptacle 24.

FIG. 3 illustrates in larger detail the elements of one type of bubble pump unit which may be used in the medicine sump 16 and which, in this figure as in FIG. 1, is generally designated 26. The bubble pump unit embodies a vertical bubble pipe 46 which is fixed in a suitable manner and in a vertical position at the side of the measuring receptacle 24. In this illustration of the bubble pump structure, the lower end of the tube, which is open, is attached to a supporting bracket 47 which is fixed as indicated to the bottom of the medicine sump 16, which bottom may either be a separate part from the cover 14 in the differential sump, or it may be a portion of the cover as will be readily apparent.

The open lower end of the bubble pipe is spaced above the bottom of the medicine sump 16, while the upper end of the pipe 48 is extended laterally to terminate over the open top of the measuring receptacle in the manner shown so that it will discharge into the latter.

The bubble pipe 46 also has fixed to it an air feeder tube 49, the upper end of which feeder tube is coupled as illustrated with the tube 45 which leads from the one-way valve unit 30 while the lower end of the air feeder tube is formed to have an upwardly directed nozzle 50 which is spaced from the lower open end of the pipe 46 and directed axially upwardly thereinto.

In the construction illustrated in FIG. 1, the differential sump 12 which, as previously stated, is air tight, houses a differential assembly which is generally designated by the reference character A and which is one of several different forms which may be employed in the apparatus and which assembly A will be hereinafter described in detail in connection with the description of the structure shown in FIG. 8. This differential assembly is operated by the liquid flowing into and out of the sump 12 and permits, when in one position of its operation, the inflow of water or other liquid and when in another position it cuts off the liquid inflow and may be employed for opening an outlet valve, all as hereinafter described, or it may merely operate to permit liquid to flow into the sump and then shut off the inflow when the sump is filled to the desired depth and the sump may be allowed to empty by the manipulation of manual valves.

FIG. 2a is a diagrammatic illustration of parts corresponding to those just described in connection with the description of FIG. 1 and is presented to facilitate the description of the operation of the apparatus and in this figure, as well as the following FIG. 2b, the same reference characters primed will be employed as were used in the description of the structure of FIG. 1.

Referring now to FIG. 2a, it will be seen, keeping in mind that the sump or receptacle 12' is air tight, that when liquid is introduced into the receptacle after the same may have been emptied through the outlet pipe 51, it will create a hyper atmospheric pressure as it rises in the receptacle. This pressure will be transmitted through the pipe 40' to the one-way valve unit 30' and pass from there through the pipe or tube 45' to the lower end of the pipe 49' which is immersed in the medicine M contained in the sump 16'. The air will be fed into the bottom end of the pipe 49' and as it rises in the form of bubbles these will push ahead of them small quantities of the medicine which will be discharged into the medicine receptacle 24'. It will be seen here, as well as upon reference to FIG. 1, that if the medicine receptacle is run over the excess will fall back into the sump 16'.

The depth of the lower end of the tube 44' in the measuring receptacle will determine the quantity which will be withdrawn therefrom to be fed back into the differential sump 12'.

After the water or other vehicle has reached the desired height in the sump 12', it will be ready to be withdrawn for transmittal to a waterer or other destination when the outlet for the sump 12' is opened to let the liquid vehicle therein pass out. As the level of the liquid drops a subatmospheric pressure will be set up which will cause the medicine from the measuring receptacle 24' to be drawn over through the one-way valve 31' and through the manifold pipe 40' for discharge into the differential sump. Thus, it will be seen that as the pressures change from above atmospheric or hyperatmopheric to subatmospheric, the bubble pump will be operated to supply medicine or other liquid to the measuring receptacle and the liquid will be then extracted and discharged into the differential sump to be mixed with the vehicle therein.

FIG. 2b is a partial diagram illustrating another arrangement which might be employed in connection with the one-way valve units. Here parts corresponding to those shown in FIGS. 1 and 2a will be designated by the same numerals double primed. In this diagrammatically shown arrangement, it will be seen that the two one-way valves may be set up in a single construction wherein one cylindrical body might be divided into two chambers to provide the air conducting check valve 31" and the fluid conducting check valve 30". From that portion of the unitary structure housing the fluid passing valve element 37", the manifold leads into the differential sump 12". From that portion of the unitary structure embodying the air passing valve element 37" leads the tube or pipe 45" which discharges air into the lower end of the bubble pipe 46". From the preceding description the operation of this alternative construction of the bubble pipe will be readily apparent.

Referring now to FIG. 4 of the drawings, there is shown another possible construction for the bubble pump and the measured medicine withdrawing tube leading to and through the one-way valve unit 31. Here the reference character 24a designates the medicine measuring receptacle which is contained within the medicine sump and which may be provided with calibrations 52 as shown.

The medicine withdrawal tube through which the medicine is extracted by means of subatmospheric pressure created in the differential sump, is here designated 44a and is in the form of a goose neck having the long leg 53, the neck portion 54 and the short leg 55 which depends into the measuring receptacle 24a. The long leg 53 of the goose neck is connected in a suitable manner to the tube 43a and the goose neck may be supported in any suitable manner so as to raise or lower the inlet end of the leg 55 in the receptacle 24a to determine by means of the calibrations 52 the quantity of medicine which it is desired to withdraw.

The bubble pump structure, diagrammatically shown in FIG. 4, is generally designated 26a and is shown as comprising a downwardly opening lower cup 56 and an upwardly opening upper cup 57 connected through their adjacent and opposed bottoms by the bubble pipe 58. The downwardly directed mounth of the lower cup 56 is supported above the bottom of the medicine sump as shown and the tubular stem 59 leads from the wall of the cup in the upper part thereof for connection with the air tube 45a. The lower portion of the upper cup 57 has an outlet spout 60 leading from the interior thereof and discharging into the open top of the measuring receptacle 24a as shown, and it will be seen from this diagrammatic illustration that as air flows in through the tubular stem 59, it will force liquid from the lower cup 56 upwardly through the pipe 58 and discharge it from the upper end of the pipe into the upper cup from which it will flow into the the measuring receptacle.

Referring again to the structure illustrated in FIG. 1, it is pointed out that this may be supported or mounted in any suitable manner with respect to a trough or other watering receptacle with which the differential sump is connected so that the mixture of medicine and liquid vehicle will be caused to flow by gravity therefrom into the watering device. In this figure, there are shown suspension strands 61 connected in a suitable manner at spaced locations around the top of the differential sump 12 and extending upwardly to a common connector 62 which is designed to be attached to any suitable support or suspension means such as a hook 63. This is merely one way in which the device can be set up for use since obviously it could be placed upon an elevated supporting structure such as a shelf or the like.

The differential assembly A hereinbefore referred to and shown in FIG. 1 embodies the use of a tumbling differential chamber in association with a float element as will be explained in the hereinafter provided description of the structure shown in FIG. 8.

In place of the assembly referred to, the tumbling differential chamber may be used independently of a float for effecting desired rocking movements of a medicine receiving pan as illustrated in FIGS. 5 and 6.

In the use of the medicine receiving pan designated generally by the reference numeral 64, the alternately changing pressures in the differential sump, designated in FIGS. 5 and 6 by the reference character 65, cause the medicine or other liquid to be extracted from the measuring receptacle, upon the decrease of pressure in the sump, and delivered into the pan 64 which is maintained in the horizontal or receiving position by the tumbling differential unit about to be described, while the liquid vehicle in the sump containing a previously introduced charge of medicine is flowing out.

As the sump is being replenished with the liquid vehicle, such as water or the like, the tumbling differential will function to tip the pan 64 to discharge the medicine previously received therein into the inflowing vehicle and the turbulence created by the inflowing vehicle will result in a very thorough mixing of the medicine therewith.

The pan 64 is suspended in a suitable manner within the differential sump as, for example, between a pair of hangers 66 to rock on a transverse pivot 67. The pan, as shown, is of elongated, triangular shape and is of substantial depth at the back end as indicated at 68 and decreases in depth toward the opposite or forward end as indicated at 69 and the axis on which the pan rocks between the supporting members 66 extends transversely of the pan near the top thereof and rearwardly of the longitudinal center or near the back of the pan. The inclined bottom of the pan has extending downwardly therefrom a pair of relatively long arms 70 between the lower ends of which is eccentrically rotatably supported the tumbling differential chamber which is generally designated 71. This differential chamber is here shown as being of circular form and of relatively narrow width and embodies, as shown in FIG. 7, the walls 72 and the surrounding peripheral wall 73. The reference character 74 designates the natural symmetry axis of the circular chamber and radially offset from this axis center is the functional axis 75 about which the chamber rotates on the pivot 76 which passes transversely through the chamber and is connected with the supporting arms 70.

The peripheral wall 73 has an opening 77 therein and covering this opening is a canopy generally designated 78 and which comprises a short wall portion 79 which is joined to one transverse edge of the opening 77 and extends outwardly across the opening for a distance where it intersects the line 80 projected from the functional axis 75 across the opposite transverse edge of the opening 77 where this wall portion then joins a longer curved or arcuate portion 81 which is in spaced parallel relation throughout its length with the outer side of the peripheral wall 73.

The action of this tumbling differential chamber is as follows. When the chamber is suspended between the arms 70 above water level, the canopied opening will be at the lower side of the chamber and to one side of a vertical line passing through the functional pivotal axis as shown in FIG. 7. As the water level rises in the receptacle in which the differential chamber is located, it will, upon arriving at the plane designated P, contact the lowermost part of the peripheral wall 73 and enter the space between the curved portion 81 of the canopy and as it continues to rise therein toward the opening 77, it will flow into the area in the uppermost part of the canopy trapping air in the area designated 82. This trapped air affects the balance of the differential chamber causing the latter to rotate in the direction of the arrow or counterclockwise as shown in FIG. 7, and the construction of the canopy is such, as will be readily apparent that in this counterclockwise rotation, the water will be prevented from flowing into the chamber.

Now, again considering FIG. 6, it will be seen that, as a result of the unbalancing of the differential chamber, the latter will have rotated counterclockwisse to the position where the canopy 81 will be uppermost and as the water level rises the buoyancy of the chamber will tip the pan 64 on the axis 67 so that the contents of the pan will flow out into the water which is coming into the sump 65. The material in the pan will, therefore, be thoroughly mixed with the rising water as the movement of the water flowing into the sump will create a turbulence which will bring about this thorough mixing. As the water continues to rise, it will, of course, eventually reach the level of the top of the chamber whereupon it will flow into the chamber and fill the same and the buoyancy which the chamber previously had will be lost and the pan will return to its normal position in which it is shown in FIG. 5 ready to receive another quantity of medicine. It will be clear that once the differential chamber is filled with water, it will not empty again until the level of the water has receded to just below the differential chamber. In these FIGS. 5 and 6, FIG. 5 shows the relative positions of the pan and differential chamber during the lowering of the water level in the sump which, as will be understood from the previous description directed to FIG. 1 and the pair of check valves, will cause a reduction of pressure in the sump and the drawing of the medicine or other liquid from the measuring receptacle into the pan. The tumbling differential chamber is, of course, full of water as shown and holds the pan horizontally and it will continue in this position until the water level reaches the low point as stated, whereupon the water will run out of the chamber and the latter becomes lightened but the pan will not tip because it is heavy on the deep end which will hold it in position. However, as, the water level continues to rise as illustrated in FIG. 6, the displacement of the emptied differential chamber becomes greater and greater and will eventually effect the unbalancing of the pan to spill the medicine or other liquid into the incoming supply of water or other vehicle.

In these FIGS. 5 and 6, no means has been illustrated for introducing the liquid vehicle into the sump or for permitting its discharge therefrom since it will be understood that such inlet and discharge means may be controlled merely by manual valves in a pipe or pipes leading to and from the sump or any suitable means may be provided for opening an outlet, such as a conventional float controlled valve. In the arrangement illustrated in these FIGS. 5 and 6, the tumbling differential chamber has no control over the water level. Its only function is to tip the pan or receptacle 64 at the proper time so, against referring to FIG. 6, as the water level continues to rise after the pan is emptied, the pan will be held in tipped position until the water level reaches a plane just a little above the differential chamber. The differential chamber then fills with water and loses its buoyancy immediately, turns over and the pan returns to its normal position as illustrated in FIG. 5.

Referring now to FIGS. 8 to 15, there are illustrated other applications of the differential chamber and arrangements thereof in association with a float means and a means for automatically opening the sump at the proper time, which may be used in the differential sump shown in FIG. 1 where one embodiment of the combination differential chamber assembly and float is shown and generally designated by the reference character A. In FIG. 8, the reference character 83 generally designates a tank or receptacle such as the differential sump or receptacle shown in FIG. 1 or any other receptacle in connection with which water or other liquid is to be caused to flow in and from which the liquid is adapted to be emptied either by a hand control means or by an automatically opening valve, the differential assembly here functioning to control a valve in a pipe line through which liquid is introduced into the tank.

The numeral 84 designates a pipe extending into the tank 83 and terminating at its top end in a valve unit generally designated 85 which preferably is of the type or construction illustrated in my Patent No. 2,810,396 wherein a ball element here designated 86 is caused to be pressed down on a seat, not shown, to shut off the inflow of liquid to the pipe or permitted to rise from the seat to let the liquid pass through into the tank, under the control of a differential mechanism.

In the present valve ball control means, there is provided a bracket 87 mounted upon the valve unit 85 and which bracket carries at one end a pair of spaced upstanding arms 88 and at its opposite end a pair of spaced upstanding arms 89, which pairs of arms are located on opposite sides of the unit 85 and the arms 88 are of less height or shorter than the arms 89. The bracket 87 rockably supports a lever plate 90 having opposite edges at one end rockably engaged in notches 91 in the opposing edges of the arms 88 in accordance with the showing in my prior patent, while the opposite end of the lever 90 passes freely between the arms 89 for up and down movement to control the valve ball 86. This lever clips to the lever plate shown in the patent referred to.

Disposed over the lever 90 is a long, flat thrust finger 92 which has the opposite edges thereof adjacent to the end of the finger overlying the free end of the lever provided with the notches 93 which interengage in notches 94 formed in opposing edges of the upstanding arms 89 and which interengaging notches 93, 94 provide a hinge or rocking connection for the finger whereby when the opposite end of the finger is raise, a down thrust will be applied to the free end of the lever 90 to cause the latter to close the valve by pressing down on the ball 86 and, of course, upon opposite rocking movement of the finger, the free end of the lever will be free to rise under the pressure of liquid entering through the pipe 84 to unseat the ball.

The opposite or free end of the finger 92 is cut out as indicated at 95 so that it may have free up and down movement between the upstanding arms 88 and this end of the finger projects outwardly a substantial distance beyond the adjacent arms 88 and there is provided in its opposite edges with the notches 96 for facilitating its loose coupling with the adjustable length link, generally designated 97 and hereinafter described in detail.

Encircling the pipe 84 is a clamp yoke which is generally designated 98 and which is in the form of a split ring having the spaced terminal end portions 99 which are apertured to have extended therethrough the threaded rod 100 having the reduced unthreaded terminal portions 101 which form pintles for the hereinafter described structure. The end portions 99 of the yoke are drawn together to clamp the yoke on the stand pipe 84 by means of the nuts 102.

For the support of the circular tumbling differential chamber here designated 103, there is provided an elongate clevis which is generally designated 104 and which embodies the two long spaced parallel arms 105 connected across one end by the transverse head portion 106. These arms 105 pass on opposite sides of the stand pipe and are provided with bearing apertures 107 in which the pintles 101 engage.

The cylindrical tumbling chamber or differential chamber here shown is of the same form as hereinbefore described and illustrated in FIGS. 5, 6 and 7 and its operation is the same as the operation given hereinbefore and, accordingly, it is not believed that a repetition of the structure of the chamber and its operation is here called for for a proper understanding of the manner in which the differential assembly functions.

The numeral 108 generally designates a small bracket element which has one leg 109 disposed against and across the inner side of the clevis head 106 and this leg 109 and the clevis head are suitably transversely apertured as indicated at 110 and 111 respectively to receive a threaded stud 112 to which is attached a float which is generally designated 113. Nuts 114 and 115 threaded on the stud 112 on opposite sides of the leg 109 and the clevis head clamp the parts firmly together.

The bracket 108 has the second leg portion 116 which is at right angles to the leg 109, for connection with the link 97 in the manner shown.

The extensible or changeable length link 97 comprises two long plates 117 and 118 of duplicate form. Each of these plates has an elongated slot 119 therein and each plate at one end is recessed as indicated at 120 and the opposing edges of the recess, adjacent to the near end of the plate, have notches 121 therein. These plates, as illustrated in FIG. 13, are disposed in overlapping relation with the notched ends remotely placed with respect to one another and with the slot 119 aligned to receive securing elements in the form of threaded bolts 122 carrying nuts 123 by which the plates are clamped together after adjusting the same relative to one another to obtain the length of link desired.

The recess 120 at the upper end of the link receives the end of the finger 92 having the notches 96 therein and these notches are interconnected with the notches 121, while the horizontally disposed leg 116 of the bracket 108 is positioned in the lowermost recess 120 of the link and has edge notches 124 interengaged with the notches 121 of the recess in which this leg is positioned.

Bearing in mind the hereinbefore described action of the tumbling differential and referring particularly to FIGS. 8 and 10, the operation of the differential assembly will be clear from the following description.

In FIG. 8 the differential chamber 103 of the assembly is in the position to which it moves downwardly while filled with water after the outlet to the sump 83 has been opened and the water level has fallen to the line designated L—L. During this lowering of the water level, the valve will be closed and when the water level reaches the indicated line, the canopy will be in a position where the contents of the differential chamber may be discharged. After the differential chamber becomes emptied, the assembly reverses itself from the position shown in FIG. 8 to the position shown in FIG. 10 due to the overbalancing of the differential chamber by the weight of the float body 113 and naturally, the float body, together with the weight of the portion of the yoke structure lying to the right of the pivot rod 100, will be of such weight, as compared with the weight of the differential chamber, as to effect this rocking movement to lift the differential chamber to the position shown in FIG. 10. This action then will open the valve by oscillating the lever actuating finger 92 to the position shown in FIG. 10 so that water will begin to run into the sump.

As the water level rises and contacts the differential chamber above the canopy as in the manner illustrated in the diagrammatic view forming FIG. 7, the chamber will turn over and thereafter remains more buoyant than the float 113 and holds the valve in its open position. When the water level reaches the high level designated H—L, the differential chamber will be submerged and the water will run into the chamber under the canopy and through the opening 77 (FIG. 7) to fill the chamber and causing the differential chamber to sink and thus effecting the closing of the valve.

FIG. 14 illustrates another arrangement of the mounting for the tumbling differential chamber and a float and employing the valve control elements illustrated in my prior patent hereinbefore referred to. In view of the fact that the patent defines the various elements of the valve actuator in detail, it is not believed that it will be necessary to repeat the description of the detailed structure of these parts here and the same, therefore, will only be generally designated. In this connection, the numeral 125 generally designates the spring clip which is connected with the float rod 126 and which, in its rocking movements under the action imparted by the float or the rocking differential chamber, rocks the lever plate 127 for effecting the opening and closing of the valve which is here generally designated 128. The float rod 126 at the left side of the spring clip 125 is extended through the transverse head member 129 of a clevis which is generally designated 130 and which corresponds to the hereinbefore referred to and described clevis 104 with exception that the head portion 129 is torsionally twisted so that the arms 131 extend downwardly at an angle to the rod 126 instead of parallel thereto as do the arms 105 with respect to the float attached stud 112.

The tumbling differential here is generally designated 132 and since its construction and manner of operation are the same as hereinbefore described, no further description of the structure or operation of the same is belived to be necessary.

The outer end of the rod 126 has attached to it one end of an arm 133 by having the end of the rod, which is threaded, extended through the arm and secured in position thereon by nuts 134. This arm extends downwardly from the rod 126 substantially at right angles thereto and at its lower end is attached by a stud 135 to the float 136. The axis of the stud 135 is perpendicular to the arm 133 and parallel with the rod 126. With this arrangement, it will be seen that when the maximum level H—L of the water in the sump is reached the differential chamber will begin to receive or take in the water and fill rapidly so as to rotate or revolve or tumble the chamber over and sink to effect the closing of the valve. This prevents any possibility of the water level rising above the valve controlled opening or entering the stand pipe under any circumstances whatever.

While the tumbling differential in the circular form here shown, or in any other form which it may be desirable to use, may be supported between the arms of the yoke in any desired manner, a preferred construction is as illustrated in FIG. 9 where there is provided a sleeve 137 which is extended through the differential chamber and projects through openings in the opposite side walls thereof and is hermetically sealed to the walls as indicated at 138. A pivot pin 139 extends through the sleeve 137 and through apertures in the arms 105 and is held in position in a suitable manner as, for example, by means of cotter keys or pins 140.

As hereinbefore stated, any suitable means may be used for effecting the discharge of contents of the differential sump. However, where it may be desired to have the action of filling and emptying the sump after having the desired medicine or other liquid introduced thereinto continuous and automatic, there is provided the discharge valve arrangement illustrated in FIG. 8. As here shown, the bottom 83 of the sump has an opening 141 therein which is formed in a depressed portion 142 of the sump bottom and a flanged collar 143 extending through this opening receives on its lower end beneath the bottom 83 the securing nut 144. Threaded into this collar is an upstanding tube 145, the top edge 146 of which forms a ball valve seat. Positioned around and extending above the tube 145 is a ball guide tube 147 having openings 148 therein located just above the top of the tube 145. Withing the guide tube 147 is a valve ball 149 which is adapted to rest upon the seat 146 and which is preferably formed of a soft elastomer, such as rubber, plastic or the like, and extending through this ball is a pin 150, a substantial portion of which projects downwardly into the tube 145 when the ball is in valved closed position and the lower end of the pin is pointed as indicated at 151.

The upper end of the pin above the ball has connected to it a chain 152 or other flexible strand which is adapted to be attached either to the float 113 or may be attached to the threaded stud 112, the latter attachment being here illustrated as being effected by means of a ring or the like which may be placed around the stud 112. It will be understood, of course, that this attachment could also be made to the float 113 in any desirable manner. The ball guide tube 147, of course, functions as a shield and while it is here illustrated as being of solid construction with the wall having holes 148 therein, it may also be in the form of a tubular screen which will serve the same purpose.

The lower end of the rod 150 is pointed as indicated to avoid a low pressure area developing below the valve and at the inlet of the pipe 153 into which the contents of the sump discharge.

It will be apparent from the foregoing that by the employment of a pull chain 152 of the proper length, when the sump fills or the contents reach the level H—L where the filled differential chamber drops to the bottom and the float rises, a pull will be applied to the chain 152 to effect the unseating of the ball, thus permitting the contents of the sump to flow out through the pipe 153. After the sump has been emptied and the differential chamber begins to rise on the surface of the incoming water, the float will, of course, lower and the valve ball will seat itself as will be obvious.

Referring now to FIG. 16, there is diagrammatically illustrated the sequential steps in the operation of the differential assembly structure, the parts being arranged in angular relation in a manner similar to that shown in FIG. 14 but it will, of course, be understood that the action depicted will take place as desired in connection with the operation of the assembly shown in FIGS. 8 and 10. In the stage a, the liquid level is beginning to rise and has reached the point where it is touching the tumbling differential chamber for the first time. With the chamber and float in the positions here shown, it will be understood that the inlet valve which they control will be open. As the liquid continues to rise in the differential assembly sump through the succeeding stages b and c, the tumbling differential chamber turns or rolls over, excluding the liquid from the chamber and, therefore, remains more buoyant than the float, holding the float under the liquid and also holding the valve in open position. When the liquid level reaches the top of the differential chamber as shown at stage c, the chamber begins to fill, the liquid running in at the opening in the wall of the chamber as hereinbefore stated. Since the differential chamber loses buoyancy by reason of its being filled as shown at stage d, the float takes over and the differential chamber sinks as illustrated and the valve is moved to shut off position. Here the sump is now ready to be emptied by any suitable means either by manual control of an outlet valve or by the automatic operation of the valve shown in connection with the assembly of FIG. 8. As soon as the outlet to the sump is opened, the liquid level will, of course, begin to drop but the differential chamber being filled with liquid will remain in its lower position and it, therefore, has materially greater weight than the float and parts attached thereto and hence the valve will be kept closed. The liquid is now running out of the sump as illustrated at stages e and f and eventually the surface drops to the low level line designated L—L and when it passes this line, the outlet to the differential chamber will be uncovered and the liquid in the differential chamber will flow out. The lightening of the differential chamber by reason of the exhaustion of liquid therefrom now will permit the weight of the float and other parts hereinbefore referred to, to overbalance the differential chamber so that the float goes down and the differential chambes goes up as shown at stage g and the valve will be opened. The liquid then again starts to flow in, causing the differential chamber to be buoyed up as shown at stage h, the stages a and b being repeated until the level of the liquid again reaches the stage c whereupon the operation will be repeated.

While in the illustration of the description hereinbefore given of the construction of the differential chamber the latter has been depicted as being circular and relatively flat, it is to be understood that tumbling chambers or differential chambers of other forms may be employed and will bring about the same action as that described in connection with the circular chamber as, for example, the chamber instead of being circular may be in the form of a flat, rectangular body with the functional axis of rotation offset from the center of the rectangle and in which case the canopy and the inlet opening corresponding to the canopy and openings 78 and 77 would be on the remote side of the center of the body from the functional axis or the differential chamber might be in the form of a flat truncated body of conical outline having the liquid inlet opening and canopy in the basal portion and the functional axis of rotation removed from the opening and canopy a distance greater than one half the length of the body.

It will, of course, also be obvious that the differential assembly as illustrated in FIGS. 8 and 10 or 14 may be mounted on an auxiliary post instead of the stand pipe, the only requirement being, in that case, that the rocking action be communicated to the valve control through a suitable coupling, such as the link 97 described.

It will be apparent from the foregoing that there is provided by the present invention a new and novel device or apparatus by means of which medicine or other liquid may be proportioned and mixed with water or any other suitable vehicle in an automatic manner requiring a minimum of attention and thus providing a very desirable means for feeding medicines or other materials to livestock in the drinking water, instead of having to manually measure out medicines and mix the same with the drinking water as is the general practice.

I claim:

1. A liquid proportioning and mixing device comprising a first receptacle for containing a liquid supply, a second receptacle adapted to receive a liquid vehicle, a liquid inlet means and a liquid outlet means for the second receptacle, said second receptacle being air-tight means for controlling flow of liquid through said inlet means and said outlet means such that introduction of liquid vehicle into the second receptacle through said inlet means creates a hyperatmospheric pressure therein and withdrawal of liquid vehicle through said outlet means creates subatmospheric pressure therein, and means operating alternately under the influence of said pressures respectively to extract a measured quantity of liquid from the first receptacle and transfer the said measured quantity of liquid into the second receptacle.

2. The invention according to claim 1, wherein the last stated means includes a bubble pump actuated by the hyperatmospheric pressure.

3. A liquid proportioning and mixing device comprising a first receptacle for containing a liquid supply, a second receptacle adapted to receive a liquid vehicle, a liquid inlet means and a liquid outlet means for the second receptacle, said second receptacle being air-tight means for controlling flow of liquid through said inlet means and said outlet means such that introduction of liquid vehicle into the second receptacle through said inlet means creates a hyperatmospheric pressure therein and withdrawal of liquid vehicle through said outlet means creates subatmospheric pressure therein, a measuring vessel, means operated by the increased pressure in the second receptacle for transferring liquid from the first receptacle into the measuring vessel, and means whereby liquid is transferred from the measuring vessel to the second receptacle under the influence of subatmospheric pressure in the second receptacle.

4. The invention according to claim 1, with means in the second receptacle for receiving the liquid drawn thereinto by the effect of the subatmospheric pressure condition therein, and means for effecting the discharge of the liquid from said receiving means.

5. The invention according to claim 4, wherein the last stated means is made operative by liquid flowing into the second receptacle.

6. A liquid proportioning and mixing device comprising a first receptacle for containing a liquid supply, a second receptacle adapted to receive a liquid vehicle, a liquid inlet means and a liquid outlet means for the second receptacle, said second receptacle being air-tight means for controlling flow of liquid through said inlet means and said outlet means such that introduction of liquid vehicle into the second receptacle through said inlet means creates a hyperatmospheric pressure therein and withdrawal of liquid vehicle through said outlet means creates subatmospheric pressure therein, an open top measuring vessel in the first receptacle, a liquid container mounted upon the first receptacle and having a discharge nozzle extending down into the second receptacle to discharge thereinto, said discharge nozzle extending below the top of the measuring vessel, means operated by the increased pressure in the second receptacle for transferring liquid from the first receptacle into the measuring vessel, and means for withdrawing liquid from the measuring vessel into the second receptacle by means of the subatmospheric pressure in the second receptacle.

7. A liquid proportioning and mixing device comprising a first receptacle for containing a liquid supply, a second receptacle adapted to receive a liquid vehicle, a liquid inlet means and a liquid outlet means for the second receptacle, said second receptacle being air-tight means for controlling flow of liquid through said inlet means and said outlet means such that introduction of liquid vehicle into the second receptacle through said inlet means creates a hyperatmospheric pressure therein and withdrawal of liquid vehicle through said outlet means creates subatmospheric pressure therein, an open top measuring vessel in the first receptacle, a liquid container mounted upon the first receptacle and having a discharge nozzle extending down into the second receptacle to discharge thereinto, said discharge nozzle extending below the top of the measuring vessel, an air pressure operated means within the first receptacle having an air conducting passageway leading thereto from the interior of the second receptacle and operated by the hyperatmospheric pressure for transferring liquid from the first receptacle into the measuring receptacle, and means whereby liquid is transferred from the measuring receptacle into the second receptacle under the influence of subatmospheric pressure in the second receptacle.

8. A liquid proportioning and mixing device comprising a first receptacle for containing a liquid supply, a second receptacle adapted to receive a liquid vehicle, a liquid inlet means and a liquid outlet means for the second receptacle, said second receptacle being air-tight means for controlling flow of liquid through said inlet means and said outlet means such that introduction of liquid vehicle into the second receptacle through said inlet means creates a hyperatmospheric pressure therein and withdrawal of liquid vehicle through said outlet means creates subatmospheric pressure therein, means for limiting the liquid head in the first receptacle, a measuring vessel having a top inlet at an elevation above said head, a pair of conduits each having communication at one of its ends with the interior of the top portion of the second vessel, a check valve in one conduit opening away from the second receptacle, a check valve in the other conduit opening toward the second receptacle, a bubble pump within the first receptacle embodying a vertical pipe adjacent to the measuring vessel, said pipe having a top end portion arranged to discharge into the measuring vessel and an open lower end portion for immersion in liquid in the first receptacle, said pump including an air feeder tube having an open end directed into said open lower end portion of said pipe and an opposite end joined to the other end of said one conduit, and the other end of said other tube terminating within said measuring vessel, the said hyperatmospheric pressure forcing air past the check valve in said one conduit to actuate said pump and the said subatmospheric pressure effecting flow of liquid from the measuring vessel through the conduit and check valve therein into the second vessel.

9. A liquid proportioning and mixing device comprising a first receptacle for containing a liquid supply, a second receptacle adapted to receive a liquid vehicle, a liquid inlet means and a liquid outlet means for the second receptacle, said second receptacle being air-tight means for controlling flow of liquid through said inlet means and said outlet means such that introduction of liquid vehicle into the second receptacle through said inlet means creates a hyperatmospheric pressure therein and withdrawal of liquid vehicle through said outlet means creates subatmospheric pressure therein, and means operating alternately under the influence of said pressures respectively to extract a measured quantity of liquid from the first receptacle and transfer the said measured quantity of liquid into the second receptacle, a movable receiver in the second receptacle into which is deposited the measured quantity of liquid transferred from the first receptacle, and a rotatably supported hollow buoyant body operatively connected with the movable receiver, said buoyant body having an air and liquid admission and outlet opening and functioning upon its elevation by and upon liquid rising in the second receptacle to move the receiver from a first position to a second position and functioning upon lowering of the liquid to a prescribed level to reversely move the receiver from the second position to the first position.

10. The invention according to claim 9, wherein said movable receiver comprises a pan having a deep end and an opposite shallow outlet end, the pan being pivotally mounted to rock on a transverse end adjacent to the deep end, and said operative connection of the buoyant body with the movable receiver comprising arms attached to the bottom of the pan between the pivotal mounting and the deep end thereof and extending downwardly therefrom, the buoyant body being of circular form and supported for eccentric rotation between said arms and said liquid admission and outlet opening being situated in the peripheral wall of the body at a position farthest removed from the eccentric axis of rotation.

11. A liquid proportioning and mixing device comprising a first receptacle for containing a liquid supply, a second receptacle adapted to receive a liquid vehicle, a liquid inlet means and a liquid outlet means for the second receptacle, said second receptacle being air-tight means for controlling flow of liquid through said inlet means and said outlet means such that introduction of liquid vehicle into the second receptacle through said inlet means creates a hyperatmospheric pressure therein and withdrawal of liquid vehicle through said outlet means creates subatmospheric pressure therein, an open top measuring vessel in the first receptacle, a liquid container mounted upon the first receptacle and having a discharge nozzle extending down into the first receptacle to discharge thereinto, said discharge nozzle extending below the top of the measuring vessel, means operated by the increased pressure in the second receptacle for transferring liquid from the first receptacle into the measuring vessel, means for withdrawing liquid from the measuring vessel into the second receptacle by means of the subatmospheric pressure in the second receptacle, said liquid inlet means for the second receptacle and control means therefor comprising a stand-pipe within the second receptacle, a valve unit upon said stand-pipe including a movable element having a valve open and a valve closed position, and motion transmitting mechanism for effecting movement of said element comprising an elongate structure, pivot means supporting said structure intermediate its ends for rocking movement in a vertical plane, a hollow body rotatably carried by one end of said structure for rotation on an axis paralleling the turning axis of said pivot means, the body having an air and liquid inlet and outlet opening, the body being supported by said pivot means in an unbalanced condition in which said opening is downward when the body is empty of liquid and the liquid level in the second receptacle is below the body, said body being constructed to have air trapped therein upon the rise of liquid in the second receptacle and becoming buoyant and turning to an inverted position and rising on and with the surface of the liquid to effect the downward rocking of the other end of the structure, means coupling said structure with the valve to open the valve upon said downward rocking of said other end, said opening passing liquid into the inverted body to effect the filling of the same, and a float connected to the said other end of said structure and effecting the rapid sinking of the liquid filled body and rocking of said elongate structure and closing of the valve.

12. The invention according to claim 11, wherein said elongate structure of the motion transmitting mechanism includes a clevis having two spaced arm portions between which the hollow body is positioned for said rotation thereof, the connection of said float to the other end of the structure including a threaded rod coupled to the clevis, the said valve element comprising a ball arranged to move up and down relative to a seat to respectively open and close the valve, and said means coupling said structure with the valve including a rockably mounted thrust means for forcing said ball down onto the seat and permitting it to move up by the rocking movement of the elongate structure.

13. The invention according to claim 11, wherein the means controlling said liquid outlet means comprises a valve, and means connected with the said other end of the elongate structure for effecting the opening of the liquid outlet means controlling valve by and upon rising of the float.

14. The invention according to claim 12, wherein said coupled clevis and threaded rod have the coupling therebetween substantially over the top end of the stand-pipe and extending downwardly therefrom in obtuse angular relationship.

15. The invention according to claim 11, wherein said elongate structure comprises a clevis having long leg portions and a transverse head at one end between and connecting the legs, the legs being disposed in transverse relationship with the stand-pipe, a bracket between said legs and carrying said pivot means for the structure, supporting means for the bracket, said head forming said other end of the structure to which the float is connected, said valve element comprising a ball arranged to move up and down relative to a seat to respectively open and close the valve, and said means coupling said structure with the valve including an elongate thrust plate, means supporting the same over the valve element and at one end for up and down rocking, a thrust finger rockably supported at one end to press down on the plate when rocked, and a coupling link between the other end of the thrust finger and the clevis adjacent to the clevis head.

16. The invention according to claim 15, wherein said coupling link consists of at least two long overlapping members and means securing the members together in longitudinally adjustable relation.

17. The invention according to claim 15, wherein said bracket is in the form of a U-clamp having spaced terminals and said stand-pipe comprising the bracket supporting means, the legs of the clevis straddling the stand-pipe and bracket and the pivot means embodying a rod extending between and joining together the bracket terminals and being located an appreciable distance from the side of the stand-pipe remote from the clevis head.

References Cited in the file of this patent

UNITED STATES PATENTS

| | | |
|---|---|---|
| 487,639 | Pohle | Dec. 6, 1892 |
| 543,620 | Bacon | July 16, 1895 |
| 680,833 | Banning et al. | Aug. 20, 1901 |
| 1,584,293 | Hegenbarth | May 11, 1926 |
| 2,042,383 | Bird | May 26, 1936 |
| 2,362,607 | Albertson | Nov. 14, 1944 |
| 2,758,716 | Oswald | Aug. 14, 1956 |
| 2,884,067 | Marken | Apr. 28, 1959 |
| 2,911,364 | Kretzmer | Nov. 3, 1959 |